July 27, 1965   M. WAHLSTROM ETAL   3,197,219
GEARED-KEY SUPPORTED JAWLESS QUICK RELEASE CHUCK
Filed Jan. 6, 1964
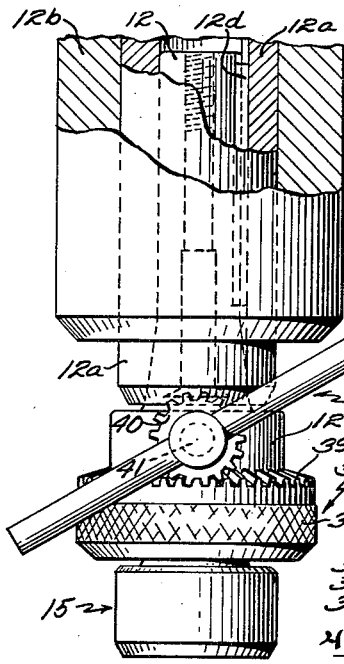
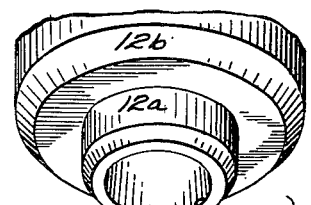
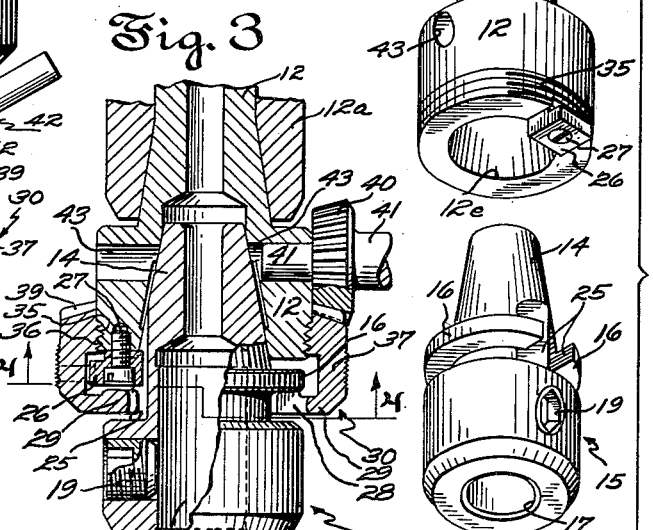
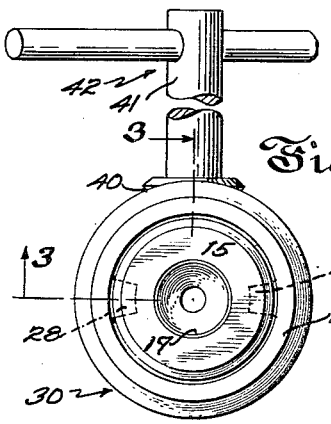
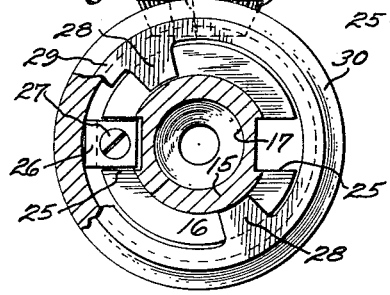
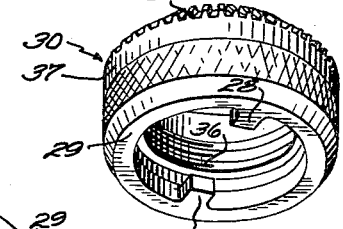
INVENTORS
Magnus Wahlstrom
William M. Hoddinott
BY
ATTORNEY.

United States Patent Office 3,197,219
Patented July 27, 1965

3,197,219
GEARED-KEY SUPPORTED JAWLESS QUICK RELEASE CHUCK
Magnus Wahlstrom, Easton, and William M. Hoddinott, Milford, Conn., assignors to The Bridgeport Machines Inc., Bridgeport, Conn., a corporation of Connecticut
Filed Jan. 6, 1964, Ser. No. 335,816
4 Claims. (Cl. 279—91)

This invention relates to a jawless chuck of the type adapted to hold the tapering shank of a flanged tool or tool holder frictionally, when such shank is thrust forcefully in an axial direction into a tapering socket in the chuck body, rather than by means of separate jaws that close radially inward against the tool shank. A quick release chuck of this general type is disclosed in United States Patent No. 3,112,117 owned by the assignee of the present application.

In the aforesaid patent a gear-toothed turn key can be used to complete a firm tightening of the chuck. Such turn keys have heretofore been used to operate conventional chucks of the radially acting jaw type by meshing with teeth of a ring gear provided at the bottom edge of a knurled surface ferrule designed to serve as a handle that is directly graspable by hand for tightening and loosening the chuck. The edge of the ferrule thus equipped with ring gear teeth has heretofore been that edge which is nearest the outboard or tool receiving end of the chuck. Such arrangement has left the turn key free to drop out of the lateral rotary bearing hole, in the chuck body below the ring gear in which the end of the stem of the turn key is removably inserted while being turned for tightening and loosening the chuck. After being so inserted the hand of the operator must support the weight of the turn key while turning it in mesh with the overlying teeth of the ring gear.

An object of the present improvements is to arrange in a quick releasable chuck a removable turn key capable of resting its weight on ring gear teeth while drivingly in mesh therewith so that the turn key need not be held uplifted by the hand of the user. This is an important convenience especially in the expeditious handling of the larger and heavier sizes of turn keys for operating chucks. It further enables the bearing hole for the end of the key stem to be placed in a more easily spotted and accessible location in relation to the other parts of the chuck and particularly the gear toothed ferrule. It prevents having to reach up over the turn key in order to tighten and loosen the chuck by direct hand grasp of the ferrule since the surface of the ferrule designed to be grasped is well below the turn key and thus is cleared of hindrance by the turn key to the upward reaching hand and wrist of the operator.

These and other objects of the invention will appear in fuller particulars from the following description of a successful embodiment of the invention, in which description reference is had to the accompanying drawing wherein:

FIG. 1 is a view in side elevation showing the improved chuck installed in the power spindle of a drill press, milling machine or similar machine tool.

FIG. 2 is a bottom plan view looking upward at FIG. 1.

FIG. 3 is a view in section on the planes 3—3 in FIG. 2 looking in the directions of the arrows.

FIG. 4 is an enlarged view of the parts in FIG. 2 shown partly broken away to expose the fully loosened position of the chuck parts.

FIG. 5 is like FIG. 4 showing a tightened position of the chuck parts.

FIG. 6 is an exploded perspective view of the chuck parts.

FIG. 7 shows in perspective a typical turn key removed from the body of the chuck.

In the drawings 12 designates the body of a chuck embodying the invention positively lodged in any power driven rotary spindle or arbor 12a turning in the vertical bearing 12b of a milling machine or drill press (not shown) and containing a tapered socket 12c in which is lodged the mounting shank of chuck body 12 rotatively interlocked therewith by key 12d and itself containing a tapered socket 12e.

14 is the tapered shank of a tool holder 15 having the circumferential draw flange 16. If 15 is a tool holder instead of the tool itself, it will contain a socket 17 adapted to receive the straight shank of a conventional tool such as a drill or end mill (not shown) which can be secured releasably in the tool holder 15 by one or more headless set screws 19.

Draw flange 16 of the tool holder 15 contains two diametrically opposite, laterally opening notches 25 each of which is extended into the round surface of the tool holder in sufficient depth to afford a shallow broad keyway capable of passing in an axial direction into rotary interlocking engagement with a driving key block 26. Key block 26 is secured on the end of chuck body 12 by a holding screw 27. Notches 25 serve the additional purpose of permitting draw flange 16 to pass in an axial direction, two diametrically opposite draw lugs 28 that project radially inward from the aperture bordering edge 29 of a ferrule 30.

The chuck body 12 has external screw threads 35 on its bottom or outboard end portion which threads mesh with internal screw threads 36 on the upper or inboard end portion of ferrule 30. Also at the top or inboard end of the cylindrical wall 37 of ferrule 30 upwardly directed ring gear teeth 39 are formed and exposed axially for mesh with bevel pinion teeth 40 carried on the stem 41 of a gear type of chuck operating turn key 42.

In the side face of the chuck body 12, above or at the inboard side of ferrule 30 and its gear teeth 39, there is sunk a small rotary bearing hole 43 in which can be inserted pivotally the end of key stem 41.

In operating the improved chuck with turn key 42 absent from its bearing hole 43, ferrule 30 is free to be screwed onto the external right hand threads 35 of chuck body 12 whether or not the tool or tool holder 15 is in place in its socket 13. After such threaded assembly of the ferrule 30 with the chuck body 12 the knurled outer surface of the former can be grasped directly by hand and turned relatively to the stationary chuck body, whether or not key 42 is in place as shown in FIGS. 1–5 for turning the ferrule with multiple leverage. Notches 25 will permit the flange 16 of tool holder 15 to pass draw lugs 28 of the ferrule in an axial direction and either of such notches will slip axially into rotary driven engagement with the driving key block 26 so that the tapered shank 14 of the tool holder can be fully inserted in socket 13. After this, turning the ferrule in clockwise direction in its screw threaded engagement with the chuck body 12 from the positions of lugs 28 in FIG. 4 to their positions in FIGS. 2 and 5 wipingly draws the tool holder flange 16 upward and firmly forces the tapered shank 14 of the tool holder onto the socket 13 and holds it there until release is desired.

To release the tool holder 15, the ferrule 30 is merely turned in reverse direction or counterclockwise direction in FIG. 4 until a stop pin 44 projecting radially inward from the side wall of the ferrule encounters the drive lug 26 on the chuck body 12 whereupon the parts are restored to their position in FIG. 5 and the tool holder can be quickly and completely withdrawn from the chuck without separating ferrule 30 from chuck body 12 because of the notches 52.

The foregoing description of operation is based on the screw threads 35 and 36 being right handed so that in order to force the tool holder 15 upward into friction locked seating in the tapered socket 12e ferrule 30 must be turned clockwise in FIG. 4. This would be a natural direction in which to turn ferrule 30 for tightening a chuck as commonly practised in operating chucks having radial acting jaws to grasp the tool shank whether or not a turn key is present to augment the tightening pressure. In conventional practice when a turn key is so used the turn key itself has also turned in a clockwise direction from the view point of the operator to complete the tightening of the chuck. This has resulted because heretofore the gear teeth on the ferrule have overlain the turn key instead of underlying it as is novelly proposed by the present improvements.

If it is desired that the turn key shall be turned clockwise from the viewpoint of the operator for tightening the chuck the applicant's improved construction results in the ferrule 30 being turned counterclockwise instead of clockwise in FIG. 4 in order to tighten the chuck. This would necessitate the screw threads 35, 36 being left handed instead of right handed and would require the limit position of stop pin 44 in the ferrule being at the side of key block 26 opposite to that in which it is shown in FIG. 4 in which position the parts are lined up rotatively to permit the draw flange 16 to escape the draw lugs 28 axially because of its notches 25. While this modification would depart from the conventional directions of turning of ferrule 30 for tightening and loosening the chuck it affords the advantage that the key could be turned clockwise in FIG. 1 and there would be less likelihood that the resistance of the work to the turning of the tool can loosen the hold of the chuck on the tool shank or tool holder 15 in the directions of tool rotation that are usual for operating on the work.

Hence the novel concepts of construction herein illustrated and described are irrespective of whether the screw threads 35, 36 are right handed or left handed and there has been made clear the modification of the position of stop pin 44 that should accompany left handedness of said threads.

The advantages residing in the novel organization of chuck parts herein disclosed are not confined to the very large and heavy types of key operated chucks hereinbefore mentioned, nor to chucks having the particular construction of parts herein disclosed for drawing the tapered mounting shank of a tool or tool holder forceably into the tapered socket of a powered rotor, but the aspects of the invention believed to be new and patentable are those covered by the definitions of the following claims:

What is claimed is:

1. A turn key operated quick release jawless chuck comprising in combination, a chuck body having a downward opening tapered socket, a hand ferrule surrounding said body, a tool holder having an upward tapering shank adapted for mounting in said socket, axial thrust transmission devices including axially abutting relatively rotatable members on said ferrule and on said holder respectively, intermeshed screw threads carried respectively by said ferrule and by said body operative to impart said axial thrust when said ferrule is turned relatively to said body, circumferential gear teeth presented upwardly on said ferrule, a turn key having a stem and pinion teeth drivingly meshable with said gear teeth, and a rotor bearing in the side of said chuck body receptive to the end of said key stem located above and on the axially opposite side of said gear teeth from said ferrule carried screw threads, whereby the weight of said key can at least in part be supported by said gear teeth while said key stem occupies said bearing.

2. A turn key operated quick release chuck as defined in claim 1, in which the said turn key stem is entirely above the said screw threads and the said gear teeth.

3. A turn key operated quick release chuck as defined in claim 1, in which the said ferrule has a cylindrical wall, telescopically overlapping said chuck body, and the said enmeshed screw threads are at the bottom end of the said chuck body and at the top end of the said cylindrical wall, the said gear teeth being formed by serrations of said top end of said cylindrical wall of said ferrule.

4. A turn key operated quick release chuck as defined in claim 3, in which the said cylindrical wall of said ferrule extends downward below the said screw threads a sufficient distance to afford a hand graspable length of said ferrule entirely below the said turn key.

References Cited by the Examiner
UNITED STATES PATENTS

| | | | |
|---|---|---|---|
| 1,398,341 | 11/21 | Pfunder. | |
| 1,620,440 | 3/27 | Cary | 279—60 |
| 2,579,082 | 12/51 | Kramer | 279—60 |
| 3,112,117 | 11/63 | Wahlstrom | 279—91 |

ROBERT C. RIORDON, *Primary Examiner.*